United States Patent [19]

Tucker et al.

[11] Patent Number: 4,782,384
[45] Date of Patent: Nov. 1, 1988

[54] AREA ISOLATION APPARATUS FOR VIDEO SIGNAL CONTROL SYSTEM

[75] Inventors: Terry L. Tucker, Boca Raton; Craig F. Fearing, Hollywood; Robert E. Schwarz, North Dade, all of Fla.

[73] Assignee: Utah Scientific Advanced Development Center, Inc., Ft. Lauderdale, Fla.

[21] Appl. No.: 922,702

[22] Filed: Oct. 24, 1986

Related U.S. Application Data

[63] Continuation-in-part of Ser. No. 776,438, Sep. 16, 1985, Pat. No. 4,710,800, which is a continuation-in-part of Ser. No. 760,339, Jul. 29, 1985, which is a continuation-in-part of Ser. No. 604,845, Apr. 27, 1984, Pat. No. 4,642,682.

[51] Int. Cl.$^4$ .......................... H04N 9/64; H04N 9/74
[52] U.S. Cl. ........................................ 358/22; 358/27; 358/28; 358/80
[58] Field of Search ................... 358/22, 28, 27, 80

[56] References Cited

U.S. PATENT DOCUMENTS

| | | | |
|---|---|---|---|
| 3,603,729 | 9/1971 | Sperber | 358/105 |
| 3,649,748 | 3/1972 | Knauer | 358/28 |
| 3,772,465 | 11/1973 | Vlahos et al. | 358/22 |
| 4,149,185 | 4/1979 | Weinger | 358/81 |
| 4,189,743 | 2/1980 | Schure et al. | 358/75 |
| 4,236,174 | 11/1980 | Gall | 358/22 |
| 4,266,242 | 5/1981 | McCoy | 358/22 |
| 4,357,624 | 11/1982 | Greenberg | 358/22 |
| 4,394,680 | 7/1983 | Watanabe | 358/22 |
| 4,396,939 | 8/1983 | Kitahama | 358/26 |
| 4,525,736 | 6/1985 | Korman | 358/28 |
| 4,533,938 | 8/1985 | Hurst | 358/27 |

Primary Examiner—John W. Shepperd
Attorney, Agent, or Firm—Jones, Askew & Lunsford

[57] ABSTRACT

A video parameter control system operative for selecting a spatial region in a video image for correction, particularly useful for a scene by scene color corrector. A track ball allows selection of a spatial region by drawing a "window" with a cursor around an object of interest in the picture. The operator then adjusts controls for the selected region or window. A first set of correction signals will be stored for the selected region; a separate second set of correction signals is stored for areas of the picture outside the selected regions, thereby allowing multiple sets of corrections for a given frame. A plurality of windows can be selected for each video frame. If an object within the window translates across the screen over a plurality of frames, or is dissolved, zoomed, or warped, the window tracks the movement of the object.

43 Claims, 6 Drawing Sheets

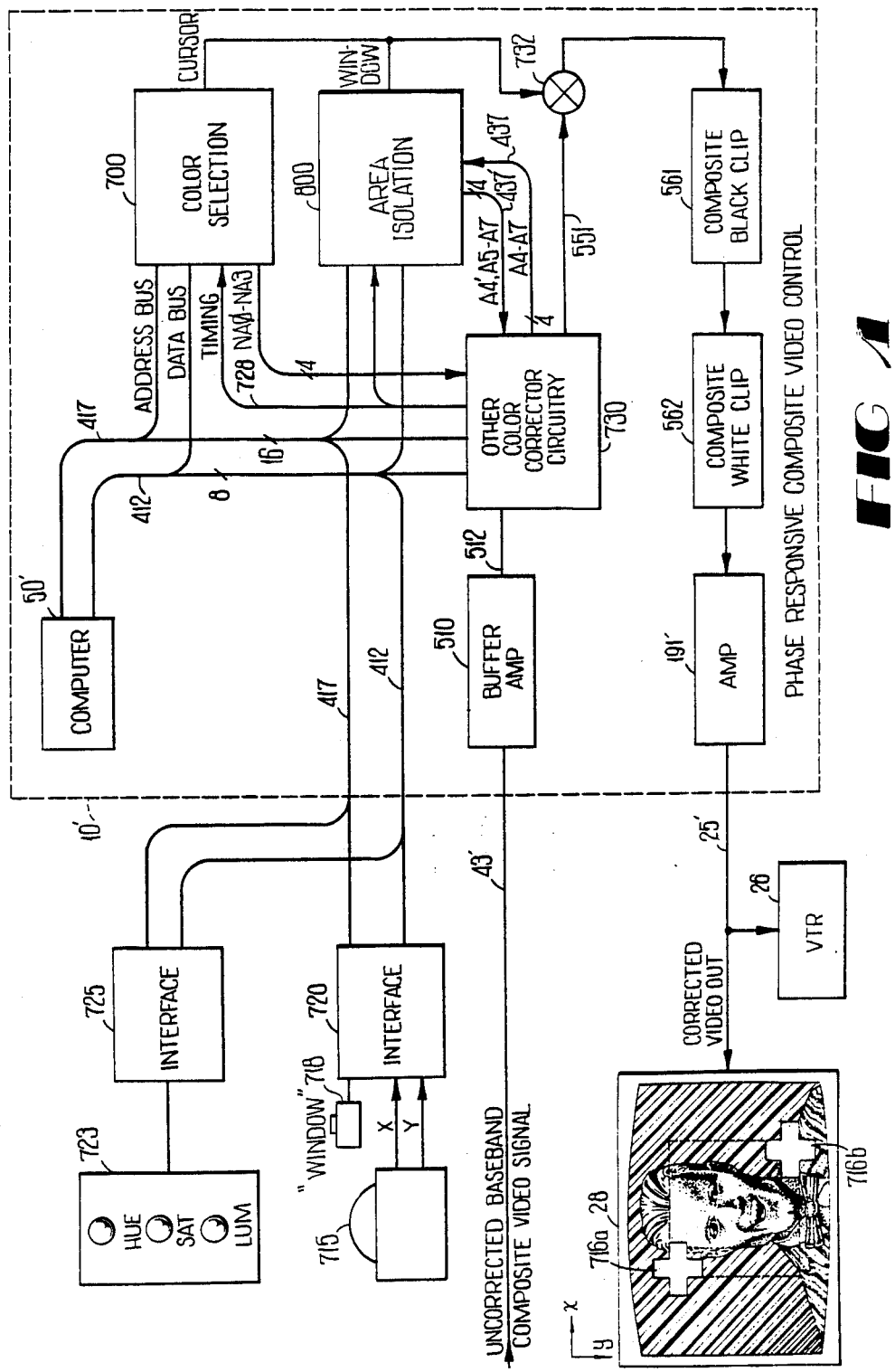

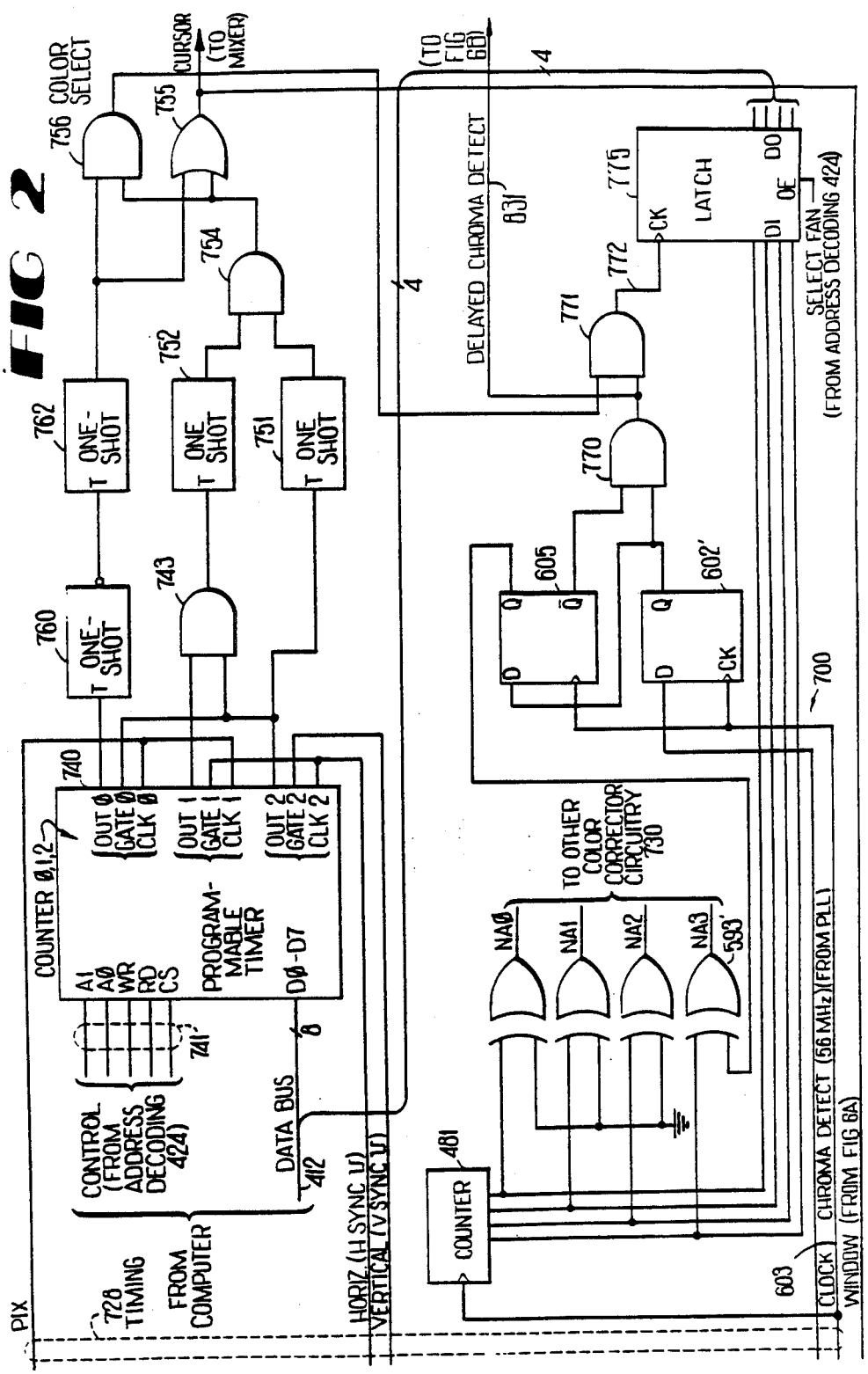

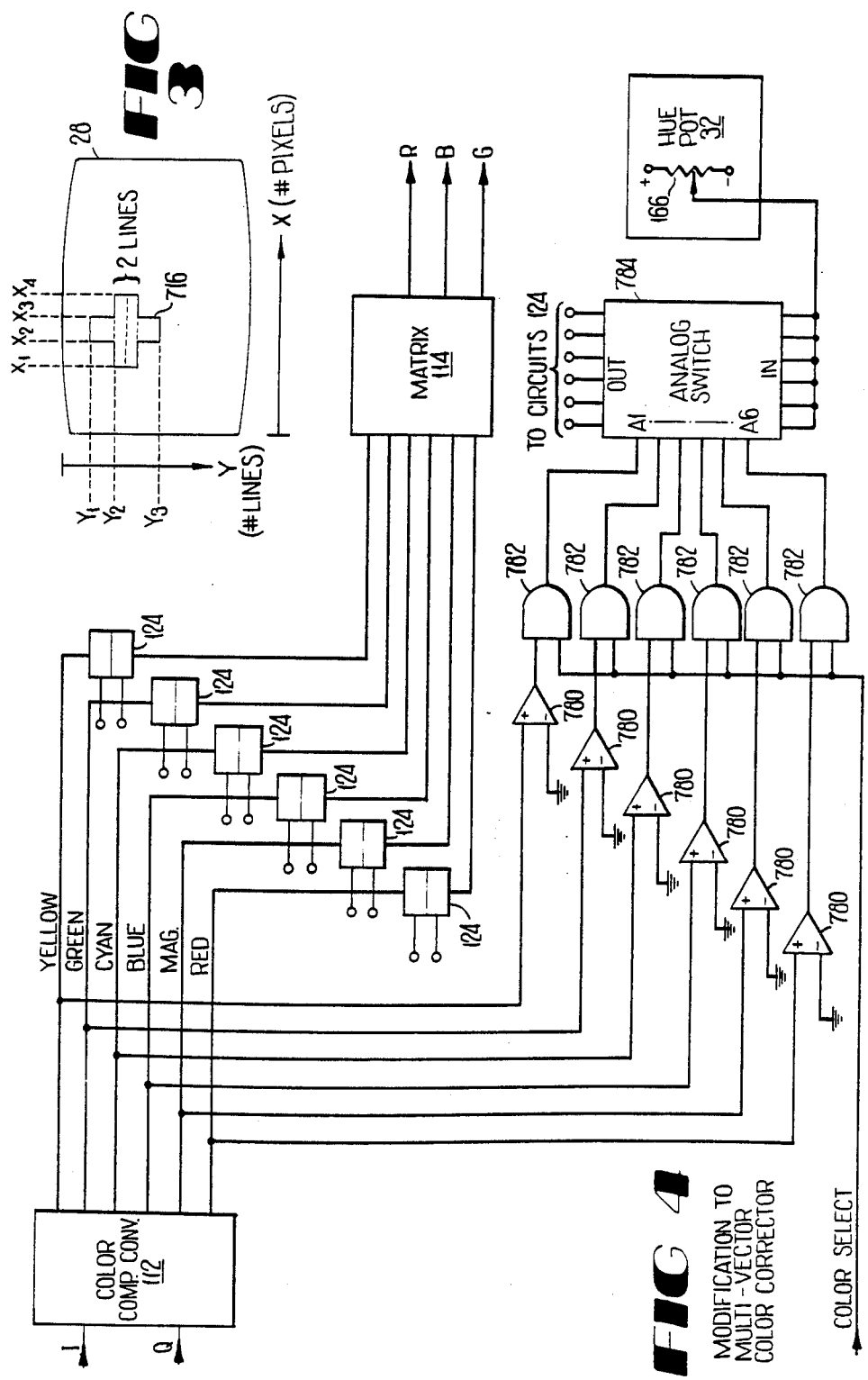

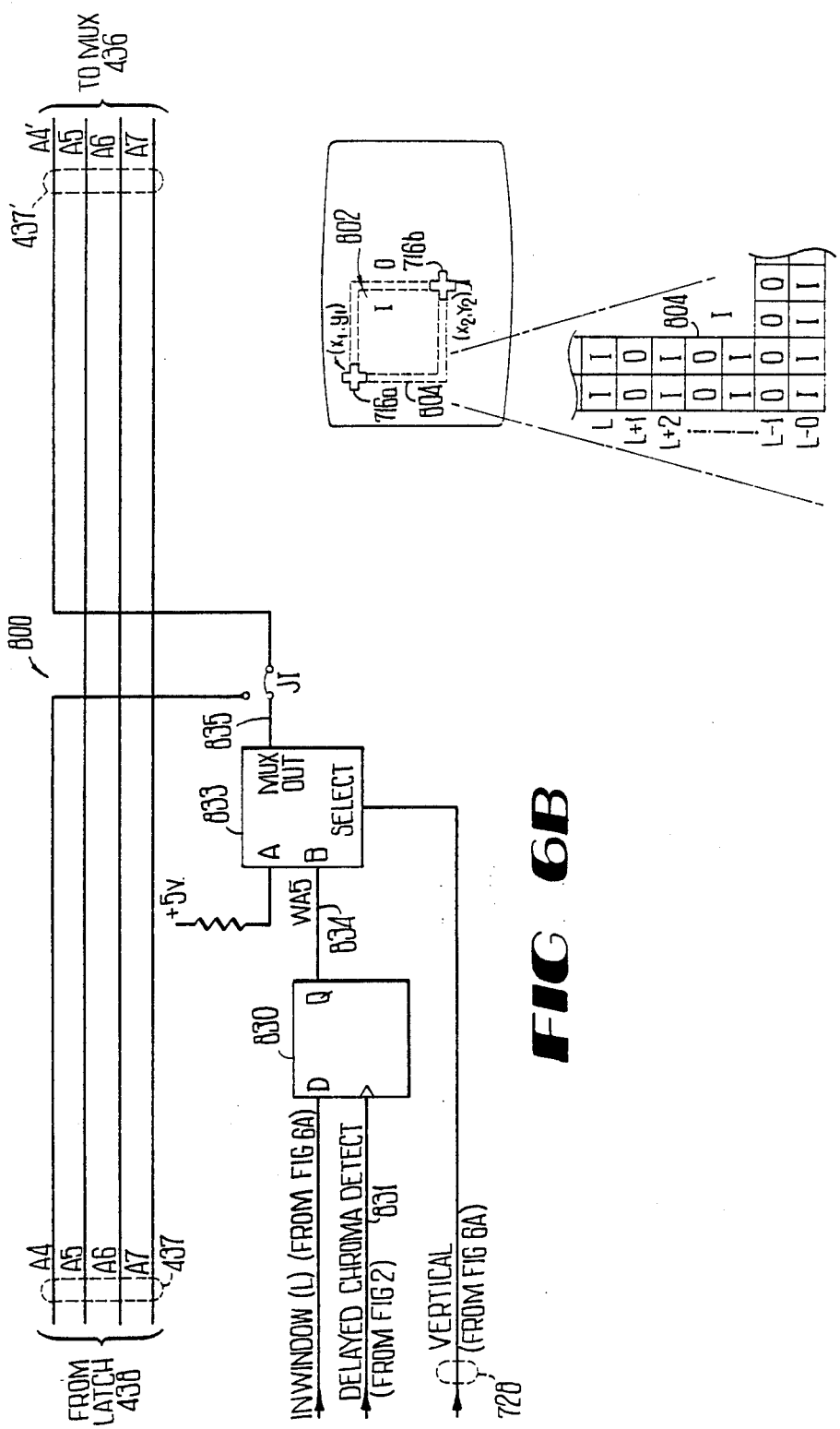

MOVE

TRACK (NONLINEAR)

ZOOM IN

WARP (ROTATE)

TRACK (PIECEWISE LINEAR)

MULTIPLE WINDOWS

AREA ISOLATION APPARATUS FOR VIDEO SIGNAL CONTROL SYSTEM

CROSS-REFERENCE TO RELATED APPLICATIONS

This application is a continuation-in-part of application Ser. No. 776,438, filed Sept. 16, 1985, now U.S. Pat. No. 4,710,800 which is a continuation-in-part of application Ser. No. 760,339, filed July 29, 1985, which is a continuation-in-part of application Ser. No. 604,845, filed Apr. 27, 1984 now U.S. Pat. No. 4,642,682.

TECHNICAL FIELD

The present invention relates generally to systems for the correction and control of video signals, and relates more particularly to an apparatus for selecting an area of a video image for color correction, the area being represented by a color video signal produced by a motion picture telecine, video tape reproducer or other video media.

BACKGROUND OF THE INVENTION

Copending grandparent application Ser. No. 760,339, the disclosure of which is incorporated herein by reference and made a part hereof, discloses a phase responsive color video signal correction system which allows correction of the spectral distribution and luminance aspects of a phase-encoded composite video signal. U.S. Pat. No. 4,096,523 to Belmares-Sarabia, the disclosure of which is incorporated herein by reference and made a part hereof, discloses another technique for color correcting video signals wherein the primary color video signals are separated into six independent primary and complementary video signals over which separate control can be exercised in making color corrections. The latter system is sometimes known as a "six vector" or "multi-vector" system.

While both of the above-referenced video signal control systems allow color correction of input video signals, both systems leave room for advancement in selecting a portion of an image represented by an input video signal for correction. Most color correction systems are generally hue oriented, in that the controls over video parameters such as hue, saturation, and luminance are grouped or organized according to hue. For example, in the Belmares-Sarabia system a panel of hue, saturation, and luminance controls is provided, there being a separate hue, saturation, and luminance control for each one of the six primary and complementary colors. In the referenced copending phase responsive video signal control system, there is also a separate hue, saturation, and luminance control for each of the color vectors or fans. Both these systems may be considered a "control per hue" system.

While there is a greater selectivity in the phase responsive system which allows an operator to select a hue for correction with greater particularity, the increased number of controls available to the operator which results from greater selectivity sometimes leads to confusion in selection of a color for control. Operators of color correction systems invariably must observe the video scene to be corrected on a color monitor, and observe variations in the image as various controls are moved until the image is aesthetically satisfactory. The proliferation of possible control provided in the control system requires an operator to constantly shift his attention between the image on the video monitor and the control panel to ensure that the proper control is moved and that settings previously made to other portions of the video image are not disturbed. Upon viewing an image which includes a region whose colorimetry is unsatisfactory, the operator must mentally associate the hue of the unsatisfactory region with the set of controls having the most pronounced influence on the region. This leads to possible inefficiencies in operation and slows the color correction process. The more controls there are, i.e. the more hues over which control may be selectively exercised, the more difficult is the task of selecting the proper set.

In U.S. Pat. No. 4,525,736 to Korman, there is shown a device for the modification of the color of television pictures in arbitrarily selected regions of color space and of the picture. This approach relies upon the magnitude of the primary color video signals in order to define a region in color space, as well as the magnitudes of the horizontal and vertical deflection voltages to define a spatial region on the screen for color correction. Signals representing these parameters are provided from a bank of control potentiometers.

The Korman approach does not allow easy identification of either the region in color space for which correction is imposed, or of the region in picture space since no operator feedback is disclosed. Accordingly, the operator must rely upon movement of the control knobs and observe the effects of movement in order to impose a color correction. Needless to say, in a scene by scene color corrector, this requires needless and repetitive movement of the control knobs and necessarily slows down the color correction process.

The Korman patent discloses use of several cathode-ray tube displays to guide the colorist in his choice for the location, shape and size for color modification regions. These allow the colorist to display the original picture, the modified version, the original picture blanked except for the selected region, or the modified version blanked except for the selected region. It would be preferable, however, if an operator of a scene by scene color corrector could view the correction area directly on the scene being color corrected in the context of the scene being corrected, without having to refer to various different displays, or switch between displays, in order to become oriented as to the nature and type of correction being imposed.

Nor does the Korman approach allow multiple simultaneous regions, or one set of corrections for areas inside a selected region and a different set for areas outside the selected region.

In addition, the Korman approach does not allow for the possibility that regions in any given scene selected for color correction may translate or move to a different area of the picture over a series of frames, or the object may be "zoomed in" on or "zoomed out" or may change its orientation as well as position.

Accordingly, there is a need for color video control circuitry which is able to select a portion of a video image for colorimetry correction without requiring an operator to mentally associate a particular hue with a particular set of controls, or to observe a plurality of different monitor scopes in order to define a region for correction. There is also a need for the ability to track a moving selected color correction region over a plurality of frames of a scene by scene color corrector.

SUMMARY OF THE INVENTION

The present invention overcomes certain disadvantages in the approaches employed in the referenced copending grandparent application, the Belmares-Sarabia patent, and the Korman patent, by allowing selection of a hue or colored region and a spatial region in the video image without requiring the operator of the system to mentally associate a hue with a set of controls or to refer to a series of displays. In particular, the video image is displayed on a color monitor, and a portion of the video image over which control is to be effectuated is selected by placing a cursor over a color region of interest whose colorimetry characteristics require correction. A single set of hue, saturation and luminance controls then is automatically rendered operative to provide corrections only for the range of hues within the window represented by the hue selected by the cursor.

In addition, a spatial region or "window" on the video image is selected by positioning the cursor in two locations around the colored region of interest in order to define a box or "window" which encompasses the colored region of interest. The region inside the window receives one set of color corrections, while the region outside the window receives a different set of color corrections. In addition, if an object inside the window translates across the screen, is dissolved, is zoomed, or is warped over a series of frames, the window can be made to "track" the movement or other dynamic characteristic.

Briefly described, the present invention comprises in a video color correction system, an improved apparatus for selecting a color for correction including means for selecting a colored and/or spatial region for correction and color correction means responsive to affect the selected region only. In the preferred embodiment, a track ball or other operator control means is provided for selecting a region on a color monitor displaying an image of the input video signal for which color correction is required. A cursor which is variably positionable with respect to the displayed image is generated for selecting a color of interest and is moved with the track ball. Circuitry responsive to the location of the cursor selects one of a plurality of video signal correction signals corresponding to a parameter of the selected region, for example, the hue, saturation or luminance as a function of the selected color. Finally, color correction means responsive to the selected correction signal corrects video parameters of the input video signal to provide a corrected video output signal.

Additionally, the cursor is employed to select a spatial region or window on the displayed image to which the corrections for the selected color of interest are confined. In the preferred embodiment, the cursor is placed at two points on the screen which are diametrically opposed from each other. These two points define a box or window containing the area of color interest. One set of color corrections are then confined to the selected color and to the selected spatial region, while another set of color corrections may be selected for areas outside the window.

Advantageously, the operator can select regions over a plurality of frames so as to compensate for movement, dissolving, zooming, or warp. In other words, the operator may select a first window on frame N, fast forward through M frames and observe that the selected colored region of interest has moved, and then select a second window at frame N+M, defining the end point of translation throughout the M frames. The computer employed in the preferred embodiment then calculates the trajectory of the window, thereby allowing the elected region to "track" or follow the movement, zooming, or warping of the selected region of color interest.

More particularly described, the present invention provides an apparatus for correcting a video parameter of a portion of a video image at least partially defined by a predetermined hue. The system of the preferred embodiment includes circuitry for detecting the predetermined hue by detecting the relative phase between the input phase-encoded composite video signal and a subcarrier reference signal, and provides a "chroma detect" signal related to the predetermined hue. Circuitry responsive to the "chroma detect" control signal recalls from a correction signal memory a particular prestored correction signal which is related to a predetermined desired value of the video parameter for that particular predetermined hue. The recalled correction signal is then employed to correct a video parameter to a desired value.

Only a single set of hue, saturation and luminance controls is required for correction of the entire color spectrum, sixteen fans in the preferred embodiment. Correction signals which reflect movement of a control knob by an operator are periodically stored in the correction signal memory during the vertical retrace interval. The memory then repeatedly provides the prestored correction signals each cycle of the subcarrier reference signal, synchronized at the beginning of each subcarrier cycle, and the correction signals corresponding to the selected hue of interest are updated to reflect control knob movement and to effectuate the color correction in real time.

The present invention further includes means for generating a variably positionable selection cursor on the video monitor displaying the image represented by the input video signal. Operator control means, a track ball in the preferred embodiment, is provided for positioning the cursor on the monitor, and for providing cursor position signals related to the location of the cursor with respect to the video image. Circuitry responsive to the cursor position signals provides a selection signal related to the cursor position. Correction signal selection circuitry is responsive to the coincidence of the selection signal and the chroma detect control signal for selecting a particular one of the correction signals being repeatedly provided by the correction signal memory. Finally, correction circuitry responsive to the selected correction signal corrects the input video signal to provide a color corrected video output signal.

Still more particularly described, the present invention includes area isolation means which allow definition of a predefined spatial region or window on the video monitor displaying the image represented by the input video signal. The operator control means is responsive to the marking of two spatial positions on the monitor to define a rectangular region to which color corrections are confined. In the disclosed embodiment, a rectangular spatial region is defined by first positioning the cursor at one corner of a region of interest, depressing a "window" switch, positioning the cursor at a diagonally opposed corner, and then depressing the "window" switch a second time to signal the computer that the opposing corners have been marked. The system is then responsive to generate the outline of a box and superimpose this outline on the picture displayed on the video monitor so that the operator may view the region to which the corrections are to be confined.

Yet still further, the movement of the window for correction by translation, dissolve, rotation, zooming, and the like may be imposed over a plurality of frames by marking a region in a first frame, followed by marking a second region in a second frame a number of frames from the first frame. The computer then is operative to calculate the trajectory and possible change in dimension of the spatial region through the series of frames between the first frame and the second frame. Accordingly, a colored object of interest over which color correction is desired may be tracked through a plurality of frames, and only color corrections appropriate for the particular hue of the selected color region within the predefined window are affected by color corrections. Advantageously, therefore, the preferred invention allows color corrections to be imposed only upon regions of interest, while other regions perhaps having the same hue are unaffected, or are responsive to a separate set of color corrections.

Video parameters over which control can be exercised include the hue and saturation of the detected portion of the video image, which are controlled by shifting the phase of the phase-encoded video signal for controlling the hue and modifying the amplitude for controlling saturation, so as to actually modify the phase-encoded video signal, as disclosed in the referenced copending grandparent application. Also controllable is the luminance of the video image represented by the composite color video signal, by altering the luminance portion of the composite video signal.

In another video embodiment for use in a multi-vector system, the selection signal derived from the cursor position routes DC control signals from the single set of controls to the independent primary or complementary color channel carrying the selected hue.

Accordingly, it is an object of the present invention to provide an improved system for the selection of a portion of a video image for which color control is desired.

It is another object of the present invention to provide an improved system for correction and control of color video signals.

It is another object of the present invention to provide an improved apparatus for selecting a portion of a video signal for luminance and spectral content correction.

It is another object of the present invention to provide a color video correction and control system which is able to detect hue information of a video image with greater selectivity and particularity than in the prior art.

It is another object of the present invention to provide a system for allowing selection of a portion of a video image for correction without requiring an operator to mentally associate a hue of the video image with a particular set of color correction controls.

It is another object of the present invention to provide a color video correction and control system which provides a single set of video parameter controls which can be selectively associated with a region on a video image which is selected by a variably positionable cursor.

It is another object of the present invention to provide an improved color video correction and control system for controlling the hue, saturation, and luminance of a portion of a video image preparatory to broadcasting or recording the video signal representing the image.

It is another object of the present invention to provide a color video correction and control system which allows selection of a portion of a video image for correction which can be employed in a composite video signal control system as well as a multi-vector color control system.

It is is another object of the present invention to provide an improved color video correction and control system which effectuates control by isolating and selecting a particular hue of interest with a selection cursor, as opposed to requiring selection with one of a bank of control knobs, and effectuating control over portions of the video image containing the selected range of hues.

It is another object of the present invention to provide an improved apparatus for selecting a spatial region or window on a video image to which color control is limited.

It is another object of the present invention to provide an improved apparatus for selecting a portion of a video image for which color control is limited which is able to track the movement of a colored object across a series of frames while still limiting the color correction to the selected object within the selected spatial region.

It is another object of the present invention to provide an improved system for selection of a portion of a video image for which color control is desired which allows for translation, dissolving, zooming, and warp of a selected object and/or spatial region of which color corrections are to be limited.

It is another object of the present invention to provide an improved system for the selection of a portion of a video image for which color control is desired for use in a scene by scene color corrector.

It is another object of the present invention to provide an improved system for the selection of a portion of a video image for which color control is desired wherein one set of color corrections is provided for the selected region while a separate set of color corrections is provided for regions outside the selected region.

It is another object of the present invention to provide an improved system for the selection of a portion of a video image for color correction which allows a plurality of sets of different corrections for a plurality of different spatial regions in any given frame.

It is another object of the present invention to provide an improved system for the selection of a portion of a video image for which color control is desired which allows ready identification and verification of the region to which color control is limited by displaying an outline of a monitor displaying the picture to be corrected.

These and other objects, features and advantages of the present invention may be more clearly understood and appreciated from a review of the following detailed description of the preferred embodiments and by reference to the appended drawings and claims.

BRIEF DESCRIPTION OF THE DRAWINGS

FIG. 1 is a schematic block diagram of a phase-responsive color video correction and control system incorporating the color region selection circuit of the present invention.

FIG. 2 is a detailed schematic diagram of the color selection circuit illustrated in FIG. 1.

FIG. 3 illustrates the geometry of the cursor generated in the preferred embodiment.

FIG. 4 is a detailed schematic diagram of the color selection circuitry adapted to be operative in a multi-vector color correction system.

FIG. 5 illustrates a selected spatial region or window on a color monitor.

DETAILED DESCRIPTION OF THE PREFERRED EMBODIMENT

Figure 6A:
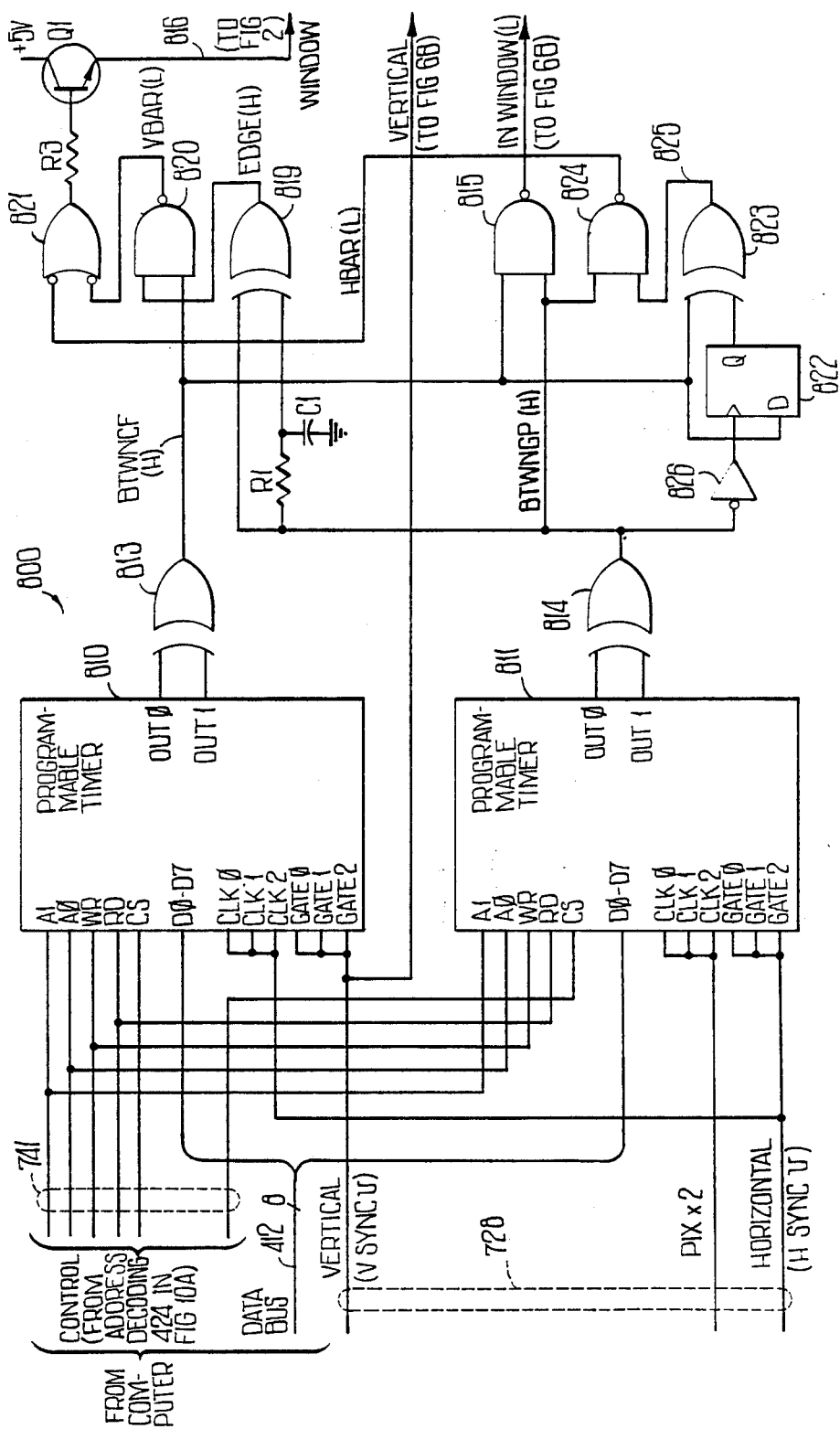
FIG. 6, consisting of FIGS. 6A and 6B, is a detailed schematic diagram of the area isolation circuit shown in FIG. 1.

Referring now to the drawings, in which like numerals indicate like elements throughout the several figures, FIG. 1 shows a block schematic diagram of a phase responsive composite video signal correction or control system 10' adapted with the color selection circuit 700 and spatial region or area isolation circuit 800 constructed in accordance with the preferred embodiment. For purposes of describing the preferred embodiment, it will be understood that the color selection circuitry 700 and area isolation circuit 800 comprise circuitry modifications to copending grandparent application Ser. No. 760,339, filed July 29, 1985 and owned by the same assignee as the present application, the disclosure of which is incorporated herein by reference and made a part hereof. Accordingly, it will be understood that the reference numbers for the components described therein are the same as herein, except as otherwise noted.

It will first be understood that the modifications described herein can be easily made to the second preferred embodiment 10' of the phase responsive composite video signal control system described in the referenced copending grandparent application. As described in that application, the phase responsive circuitry operates to detect the instantaneous hue of a video image, provides signals which select one of a plurality of color intervals or windows within which the detected instantaneous hue falls, imposes prestored correction values associated with the selected color interval, and converts the selected correction signals into signals which modify the phase, amplitude and luminance level of the composite video signal, to produce a color-corrected composite video signal output.

In order to provide color selection and area isolation ability for the referenced phase responsive color correction circuitry, there is provided color selection circuitry 700 and an area isolation circuit 800 which operate in conjunction with the phase responsive video signal correction system 10'. In addition, a track ball 715, the structure and operation of which will be known to those skilled in the art, provides a signals indicative of movement of the track ball by an operator to position a cursor 716 on the color monitor 28 which displays the video signal for which correction is desired. Generally, the video image will be still-framed or "frozen" by means (not illustrated) in the telecine or other video reproducer system.

As shown more particularly in FIG. 5, the area isolation of circuit 800 allows the definition of a spatial region or window 802 by placement of two cursors 716a, 716b at opposite corners of a "box" 804. In accordance with the invention, only the spatial region 802 inside the box 804 (labelled "I") is affected by color corrections selected when the window is active. Regions outside the box (labelled "O") are responsive to color corrections selected while the window is not active. Thus, separate sets of color corrections is provided for the area I and for the area O.

The track ball 715 in the preferred embodiment is a conventional optical-encoder track ball which provides two pulse trains indicative of movement in an X and Y direction, shown in FIG. 1 as lines X and Y, to an interface circuit 720. The interface circuit is also conventional and operates to convert the pulse trains received on the X and Y input lines into a form which can be read by computer. Preferably, the pulse trains increment or decrement a pair of registers (not shown) in the interface, one for the X coordinate and one for the Y coordinate, the incrementing or decrementing being a function of the direction of movement of the track ball.

In the preferred embodiment, the interface circuit 720 is connected to the address bus 417 and data bus 412 of the microcomputer 50' so that the movement of the track ball by the operator can be converted into signals indicative of the desired position of the cursor. The microcomputer 50' may be the same as microcomputer 50' shown in copending grandparent application Ser. No. 760,339. Conventional interfacing techniques are employed to provide the signals from the movement of the track ball to the microcomputer 50', for example, providing an interrupt to the operation of the microcomputer 50' whenever there is movement of the track ball, or alternatively providing periodic polling of the interface circuitry 720 under program control so as to read the registers containing the accumulated number of pulses reflecting movement of the track ball.

The microcomputer 50' operates to convert the X and Y movement of the track ball 715 into an absolute X and Y coordinate relative to a video frame. In particular, and with reference to the NTSC television standards, the Y coordinate can vary between 0 and 525, there being 525 lines per frame or 262.5 lines per field. The X coordinates on the video monitor are expressed in terms of the theoretical maximum pixel resolution for color television, namely, 0 through about 230. Those skilled in the art will of course understand that the horizontal pixel resolution is determined by the frequency of the subcarrier, 3.58 MHz, and that the theoretical maximum number of pixels per line of approximately 230 results from the application of the subcarrier frequency to the frame rate, at one pixel per subcarrier cycle. Thus, for a line rate of 15,734 lines per second under NTSC color standards, there are approximately:

$$3.58 \times 10^6 \text{ pixels/lines} \div 15,734 \text{ lines/sec} \approx 228 \text{ pixels/line}.$$

It will therefore be understood that the microcomputer 50' is programmed to convert the movement of the track ball 715 into an absolute X coordinate varying between 0 and 230, and into an absolute Y coordinate varying between 0 and 525. These X and Y coordinates are employed to determine the coincidence of the cursor with a colored region on a video scene being displayed, in a manner which will be described in connection with FIG. 2.

A "window" switch 718 is also connected to the interface 720 so as to allow the operator to signal the microcomputer 50' when he or she desires to define a spatial region on the monitor 28. By depressing the window switch 718, the computer recognizes that the first corner of a predefined region has been selected by the operator. The computer then records the X and Y position of the cursor, such as $(X_1,Y_1)$ in FIG. 5. After moving the track ball 715 to the diagonally opposite corner of a selected region, for example to the position shown at 716b in FIG. 5, followed by a subsequent depression of the window switch 718, the microcomputer 50' records the position $(X_2,Y_2)$ and has all the information required to define the rectangular region 802.

In response to the second depression of window switch 718, an outline of the box 804 is generated on the monitor to indicate to the operator that a window has been defined and is being recognized by the microcomputer. Corrections resultant from movement of the control knobs in panel 723 (FIG. 1) are now limited to the window. It will therefore be understood that the microcomputer 50' is programmed to convert the movement of the track ball 715 in response to subsequent depressions of the window switch 718 into a pair of absolute X coordinates and a pair of absolute Y coordinates defining a spatial region on a scene being displayed.

A single set of hue, saturation, and luminance controls 723 is provided for receiving operator control over a selected hue or in a selected window. A control knob interface 720 converts the movement of the knobs in the panel 723 into digital signals, which can then be read by the microcomputer 50' over data bus 412 in response to an address provided over address bus 417. The preferred control knob and interface is an optical encoder type, such as described in U.S. Pat. No. 4,597,006 entitled "VIDEO SIGNAL CONTROL SYSTEM", owned by the same assignee as the present application, the disclosure of which is incorporated herein by reference and made a part hereof.

The uncorrected input baseband composite video signal is provided on line 43' from an external source (not shown) and corresponds to the similarly denominated signal in the referenced copending grandparent application Ser. No. 760,339. The uncorrected signal is provided through a buffer amplifier 510, and thence to the color correction circuitry illustrated in FIGS. 10A, 10B and 10C of the referenced copending grandparent application, generally designated at 730. It should be understood, however, that the other color correction circuitry 730 shown in FIG. 1 corresponds in particular to the video signal processing circuit components of FIG. 10C in the referenced copending grandparent application, and that the circuitry of FIG. 10C is controlled and supported by the circuitry of FIGS. 10A and 10B.

As described in the copending grandparent application, the microcomputer 50' communicates via the data bus 412 and address bus 417 with the various components in the color corrector. Timing signals, described in connection with FIG. 2, are provided from the color corrector circuitry 730 on lines 728 to the color selection circuit 700 and to the area isolation circuit 800. The output of the color selection circuit 700 is the four address lines for the ECL RAMs 430a–430c (FIG. 10A of the referenced copending grandparent application) on address lines NA0–NA3, which correspond to the similarly denominated signals in the copending referenced grandparent application. Those skilled in the art will recall that these actual address lines NA0–NA3 select one of a number of prestored correction signals stored in the memories 430 in the referenced copending grandparent application, in the manner described therein.

Another output of the color selection circuit 700 is the CURSOR signal. This signal causes the generation of the variably positionable cursor on the monitor 28. The CURSOR signal is combined with the color corrected video signal provided on line 551 from the other color correction circuitry 730, which corresponds to the same line 551 in FIG. 10C of the referenced copending grandparent application. The CURSOR signal is mixed with the color corrected video signal via a conventional video mixer circuit 732, the output of which is then provided to the composite black clip circuit 561, which corresponds to the similarly denominated circuit in the referenced copending grandparent application. Those skilled in the art will understand that the CURSOR signal is combined with the color corrected composite video signal in a manner so as to "overlay" or superimpose the cursor on the color corrected output signal by driving the video signal to white at such times as may be required to create a cursor.

Also shown generally in FIG. 1 is the area isolation circuit 800 which is responsive to the actuation of the window switch 718 and the positioning of the cursors 716a, 7116b to define a window on the monitor 28. The area isolation circuit 800 is connected to the computer data bus 412 and address bus 417 in the manner similar to the connection of the color selection circuit 700. Additionally, timing signals on lines 728 are provided to the area isolation circuit 800. The area isolation circuit 800 also receives as inputs the address lines A4–A7 which are the four address lines for the ECL RAMs 430a–430c on lines 437 prior to multiplexer 436 shown in FIG. 10A of the referenced copending grandparent application. In order to modify the circuit shown in FIG. 10A of said application, the lines 437 are "cut" from multiplexer 436 and provided instead to area isolation circuit 800. One output of the area isolation circuit 800 are address lines A4', A5, A6, and A7 which are connected back up to multiplexer 436 in FIG. 10A. It will thus be understood that the connection of lines 437 shown in FIG. 10A of the referenced copending grandparent application is broken, and the area isolation circuit 800 interposed therebetween. Primarily, the signal A4 is affected, and the resultant output signal A4' provided to indicate when color corrections are indicated for the selected spatial region 802, or the outside, unselected region. Those skilled in the art will understand that these address lines A4', A5, A6, and A7 select one of a number of prestored correction signals stored in the memories 430 in the referenced copending grandparent application, in the manner described therein.

Another output of the area isolation circuit 800 in FIG. 1 is the WINDOW signal. This signal causes the generation of a visibly discernable outline on the monitor, as shown in FIG. 5 at 804, so that the operator may observe on the monitor the region being affected by color corrections. The WINDOW signal is combined with the CURSOR signal, and then combined with the color corrected video signal provided on line 551. It will therefore be understood that the signal provided to the video mixer circuit 732 is a wire-ORed connection between the CURSOR signal and the WINDOW signal.

The output of the color corrector 10' is provided on line 25', which corresponds to the similarly denominated signal CORRECTED VIDEO OUT in the referenced copending grandparent application, which is displayed on a color monitor 28 for viewing by the operator as the color corrections are made, and for recording the corrected signal on a video tape recorder (VTR) 26 as color corrections are recalled from computer memory for permanently preserving the color corrections.

Turning to FIG. 2, there will now be described the construction of the color selection circuit 700 and its operation in conjunction with the phase responsive color correction circuitry 10' in FIG. 1. Generally, the circuitry illustrated in FIG. 2 comprises two sections: cursor generating circuitry, which creates the visible cursor for the operator which may be moved with the track ball 715, and correction signal selecting circuitry responsive to the cursor position to select a particular correction signal. The center intersection of the cross hair or cursor produces a COLOR SELECT signal which operates in conjunction with the CHROMA DETECT signal produced by the color correction circuitry to enable the latching of the state of the ECL RAM high speed address generator. In other words, the COLOR SELECT signal, which occurs once per video frame, selects the hue of the object at the center of the cursor by latching the address being provided to the ECL RAM, which contains the correction signal for the selected hue. The latched address is then provided to the computer, which responds to the selected correction signal address by routing corrections from the controls 723 to the corresponding ECL RAM address so that the effects of operator control can be effectuated and observed. By operating a control to change the correction signals stored in the ECL RAM, the operator thereby effectuates color control only over hues within the fan or window selected by the COLOR SELECT signal.

First will be described the circuitry for generating the COLOR SELECT signal and the CURSOR signal. In order to generate the cursor, it is necessary for the microcomputer 50' to maintain an X and Y coordinate which corresponds to the line number and the pixel count of the current location of the cursor. For this function is provided a programmable timer circuit 740 which is configured to operate as three programmable one-shots. In the preferred embodiment, a type 8254 programmable interval timer manufactured by Intel Corporation of Santa Clara, Calif. is employed and connected to receive commands and data over the data bus 412 and control lines 741 from the computer. The preferred timer includes three separately configurable and addressable circuits, counter 0, counter 1, and counter 2, each of which has a separate GATE and clock (CLK) input, and provides an output OUT when the timer times out. Details of the operation and internal structure of the 8254 timer circuit are available in the literature provided by the manufacturer.

Control signals from the microcomputer 50' are provided on lines 741 from address decoding circuitry 424 described in FIG. 10A of the referenced copending grandparent application. Those skilled in the art will understand that by manipulating the address selection inputs A1, A0, the write (WR) input, the read (RD) input, and the chip select (CS) input, the timer circuit 740 can be configured to operate in the manner herein described. The eight-bit data bus from the computer 412 is connected to the appropriate data bus lines D0–D7. It will also be appreciated that each of the three separate timer circuits within the programmable timer 740 are independently enabled by a gate input, denominated GATE0–GATE2 in FIG. 2, which operate as will be described.

It will be understood that the programmable timer circuit 740 is employed not only to generate the cursor at the appropriate time, but also to cause the cursor to possess a generally "plus" (+) or cross hair shape. With reference now to FIG. 3, there will now be described the operation of the three counters to generate the COLOR SELECT and the CURSOR signal. The first appearance of the cursor will occur at $Y_1$ number of lines after vertical blanking, as determined by counter 2, and $X_2$ number of pixels from horizontal blanking, as determined by counter 1. Counter 1 will produce an output on OUT1 every line, the appropriate number of pixels (in the X direction) over, while counter 2 counts the number of lines in the field and therefore is the "line counter". Counter 2 is clocked by the horizontal sync signal HORIZ and enabled by the vertical sync signal VERTICAL at its gate input GATE2. Counter 0 produces the broad horizontal portion ($X_1$–$X_4$) of the cursor 716 (the narrow horizontal portion $X_2$–$X_3$ is produced by other means, described next).

Counter 0 and counter 1 are clocked by a signal designated PIX, which is a 3.58 MHz signal synchronized to subcarrier. PIX is 180 degrees out of phase with respect to subcarrier on alternate lines because under NTSC standards subcarrier changes phase on alternate fields. Thus, PIX is a constant phase pixel frequency, derived from subcarrier by circuitry (not shown) known to those skilled in the art.

The signal OUT1 from counter 1 is provided to one input of an AND-gate 743, while the output OUT2 from counter 2 is provided to the other input. The signal OUT2, which occurs only on the proper line, is also provided to the gate input GATE0 of counter 0 as well as to the trigger input of a one-shot 751. The output of AND-gate 743 triggers a second one-shot 752. When counter 2 reaches the proper line, and the proper number of pixels required to reach $X_2$ has been reached, as manifested by OUT1, AND-gate 743 will trigger one-shot 752. One-shot 752 is selected with a time period so as to time-out at point $X_3$, producing the narrow width of the cursor. Thus, when the point $X_2$, $Y_1$ on the cursor is reached, both inputs to the AND-GATE 743 are high, firing the one-shot 752. One-shot 752 is user-adjustable by timing components (not shown) which control the time of occurrence of the cursor point $X_3$, $Y_1$, and thus controls the narrow width of the cursor.

One-shot 751 is triggered upon each occurrence of OUT2, when the appropriate line number in the frame has been reached, and provides a pulse during the entire cursor; when one-shot 751 times out, AND-gate 754 will be disabled and the cursor is terminated. One-shot 751 is therefore selected with a time constant sufficient to establish the point $X_3$, $Y_3$ of the cursor, and remains triggered for several scan lines. Increasing the time constant of one-shot 751 causes the cursor to extend a greater number of lines in the vertical (Y) direction.

The outputs of one-shots 751 and 752 are provided to inputs of an AND-gate 754, whose output is provided to the inputs of an OR-gate 755 and another AND-gate 756. The concurrent firing of one-shots 751 and 752 produce a signal on the output of AND-gate 754 and therefore causes the CURSOR signal to appear from the output of OR-gate 755, thereby defining the narrow portion of the cursor extending between $X_2$ and $X_3$.

The COLOR SELECT signal is not yet provided since this signal only occurs once per video field, notwithstanding that one-shots 751 and 752 produce pulses of sufficient width to produce a visible cursor in each field of the frame.

Counter 0 in the programmable timer 740 is provided for determining the location of the point $X_1$, $Y_2$, that is, the beginning of the wide horizontal or "bar" portion of the cursor 716. This counter is enabled by the signal OUT2, which it will be recalled occurs only on the appropriate line number of the beginning of cursor. Counter 0 thus times from point $X_2$, $Y_1$ to a point immediately before point $X_1$, $Y_2$, the beginning of the wide portion of the cursor. This time of course may be varied by the computer under software control, thereby affecting the height of the narrow upright portion of the cursor $X_2$, $Y_1$. One-shot 760 controls the precise point of $X_1$, $Y_2$; counter 0 is used for the majority of the delay time (to prevent jitter in the cursor), while one-shot 760 provides a user adjustable delay for precisely positioning the point $X_1$, $Y_2$.

One-shot 752 will fire once per line after reaching the first line of the cursor until counter 0 expires, at which time the signal OUT0 will occur, firing one-shot 760. The rising edge of the pulse provided by one-shot 760 triggers a subsequent one-shot 762, the output of which is connected to one input of AND-gate 756 and to the other input of OR-gate 755 which produces the CURSOR signal. One-shot 762 controls the time of occurrence of the cursor point $X_4$, $Y_2$, and thus the width of the wide bar of the cursor.

When the counter 1 times out of a line within the wide part of the cursor, producing the OUT1 signal and ultimately a signal from the AND-gate 754, there will be coincident inputs to the AND-gate 756, producing the COLOR SELECT signal. It should be understood that the counter 0 is only triggered once per video field due to its triggering by reaching the appropriate line as manifested by OUT2. It will therefore be understood that the crossbar or horizontal portion of the cursor is only two lines thick in the disclosed embodiment, and that the selection point of the cursor is the point $X_2$, $Y_2$, which the operator positions over a color of interest.

At such time as the one-shot 751 finally times out, the cursor point X3,Y3 will be produced, disabling any further CURSOR signal or COLOR SELECT signal until the next video field.

In order to select the appropriate color correction signal, the COLOR SELECT signal is employed to latch or freeze the ECL RAM address represented by the signals NA0–NA3. It will be recalled from the discussion in the referenced copending grandparent application that the CHROMA DETECT signal is delayed an amount to allow for signal propagation, and then employed on its rising edge to signify a positive crossing of the chroma portion of the phase-encoded video signal. It will be further recalled that a high speed counter 481 is employed to divide the subcarrier into a number of different color intervals or fans, each of which corresponds to a different color correction stored in the ECL RAM 430. As in the referenced copending grandparent application, counter 481 cycles through the color fans once per subcarrier cycle. The CLOCK for counter 481 and the modifications illustrated in FIG. 2 is 56 MHz, provided from the phase-locked loop circuitry 150' in the phase responsive color corrector. A clock frequency of 56 MHz allows the subcarrier to be divided into sixteen different fans or windows. This contrasts with ten described in the referenced copending grandparent application.

The 56 MHz CLOCK signal on line 603, in addition to clocking the counter 481, clocks a high speed D-type flip-flop 602', which corresponds to the flip-flop 602 in the referenced copending grandparent application, and a high speed D-type flip-flop 605. The CHROMA DETECT signal is provided to the D input of flip-flop 602'; the output Q of flip-flop 602' is connected to the D input of flip-flop 605, as well as to an input of an AND-gate 770. The negated-Q output of flip-flop 605 is connected to the other input of AND-gate 770. It will therefore be appreciated that a pulse of about 18 nS is provided at the output of AND-gate 770 coincident with the delayed rising edge of the CHROMA DETECT signal. This pulse is denominated DELAYED CHROMA DETECT and is provided on line 831 to the area isolation circuit 800.

The Q output of flip-flop 605 is provided to one input of the exclusive OR-gate 593', which corresponds to the exclusive OR-gate 593 in the copending referenced grandparent application, to perform the address complementing function described therein for twice-per-subcarrier-cycle selection of the same correction signal.

The coincident output of AND-gate 770 and the COLOR SELECT signal provides a pulse from an AND-gate 771 on line 772 to the clock (CK) of a high-speed latch circuit 775. The latch 775 in the preferred embodiment is a type SN74AS873 4-bit D-type latch with three-state outputs, manufactured by Texas Instruments. The output enable (OE) input of the latch 775, receives a signal SELECT FAN, which is provided from address decoding circuitry 424 in FIG. 10A of the referenced copending grandparent application (not illustrated). The data outputs D0 of latch 775 are connected to the data bus 412 of microcomputer 50'. Those skilled in the art will understand that microcomputer 50' can select the output lines D0 of the latch 775 to be placed on the data bus 412 under program control so that the microcomputer can determine the hue of the colored region over which the cursor is placed. It will therefore be appreciated that the data contained in the latch 775 corresponds to the selected color fan or interval coincident with the cursor.

It will now be understood that the circuitry described above provides a means for generating a variably positionable selection cursor on the video monitor displaying the input video signal, as well as circuitry for positioning the cursor on the video monitor and providing cursor position signals related to the location of the cursor with respect to the video image. In addition, the COLOR SELECT signal comprises a signal related to the cursor position with respect to the video image. The coincidence of the COLOR SELECT signal with the delayed CHROMA DETECT signal provides correction signal selecting means that are responsive for selecting a particular one of the prestored correction signals for receiving operator corrections under program control. Thus, moving a hue, saturation, or luminance control can be directed by the computer to the appropriate ECL RAM memory location so that during the vertical retrace interval the updated or revised correction values can be loaded into ECL RAM, thereby causing the desired color corrections to be imposed upon the image being displayed. Finally, it will now be appreciated that the circuitry is responsive to correct the input video signal as a function of the operator controls provided, and that the operator control is directed to the color fan selected by the operator by positioning the cursor.

Turning next to FIG. 6, consisting of FIGS. 6A and 6B, the area isolation circuit 800 comprises circuitry commands from the microcomputer 50' to establish the boundaries of the window 802 and to select one set of corrections for areas within the window and another set of areas outside the window. A pair of programmable timer circuits 810, 811 operate as four programmable one-shots. Type 8254 programmable interval timers manufactured by Intel are employed to provide this function. These timer circuits 810, 811 receive commands and data over the data bus 412 and control lines 741 from the microcomputer 50' in the manner similar to that described in connection with the timer 740 in FIG. 2.

The timer circuit 810 is basically a lines counter and is employed to determine when a portion of a given video field is between the upper and lower boundaries of the window region displayed on the monitor. In like manner, the timer circuit 811 determines when a portion of a given line on the monitor is between the left and right edges of the window. Accordingly, timing values from the microcomputer 50' are provided to two of the separate circuits within the timer circuit 810 for establishing (1) when the top or "ceiling" edge of the window has been found, and (2) when the bottom or "floor" edge of the window has been encountered, in a given video field. Similarly, two of the circuits within the timer circuit 811 receive timing values from the microcomputer to determine (1) when the left vertical edge of the window has been encountered on each video line and (2) the right vertical edge has been encountered on that same line.

Accordingly, the timer circuit 810 which detects when a portion of a given video signal is between the ceiling and floor of the window is clocked or counted by the HORIZ signal for counting lines; the counters in circuit 810 are all enabled at their GATE inputs by the VERTICAL signal so that counting can only occur during the active picture portion and not during the vertical retrace interval.

The timer circuit 811 which detects when the region of a given video line is between the vertical edges or "goal post" of the window is clocked by a signal designated PIX xs2, which is twice the 3.58 mHz signal synchronized to subcarrier, in order to provide fine horizontal resolution. The timer circuit 811 is enabled by its GATE inputs by the HORIZ signal so that counting of pixels across a line can only occur during the active picture portion and not during the horizontal retrace interval. It will thus be appreciated that the timer circuit 810 operates as a "line counter" in the Y direction, while the circuit 811 operates as a pixel counter in the X direction.

In order to detect when the video signal is between the ceiling and floor of the window, an exclusive-OR gate 813 receives the outputs OUT0 and OUT1 from the timer circuit 18. When the OUT0 signal occurs, the gate 813 produces a high-true signal BTWNCF which signifies that a sufficient of video lines have been counted so that the ceiling of the window has been encountered. When the OUT1 signal is provided, indicating that a sufficient number of horizontal lines have been counted to indicate that the floor of the window has been encountered, the BTWNCF signal will go low.

In a similar manner, an exclusive-OR gate 814 provides a high-true signal BTWNGP to signify that the portion of a given video line is "between the goal posts" or vertical edges of the window. The OUT0 output of timer 811 provides one input to the gate 814, and causes the BTWNGP signal to go high, while the occurrence of the OUT1 signal forces the output of exclusive-OR gate 814 low.

The BTWNCF signal and the BTWNGP signal are both provided to inputs of a NAND gate 815, whose output is designated INWINDOW, a low-true signal which is asserted when the video signal being processed in the system is in the window region 802. This signal is provided to circuitry in FIG. 6B, to be described further hereinbelow.

Other circuitry illustrated in FIG. 6A generates the WINDOW signal on line 816 which is superimposed on the video signal being corrected so that a visible display of the window's outline may be observed by the operator. An edge detector circuit comprising an exclusive-OR gate 819 and RC network comprising resistor R1 and capacitor C1 receives the BTWNGP signal and generates a pulse signal denominated EDGE on the first assertion of BTWNGP. The values of R1 and C1 are selected to provide a desirable width for the vertically extending left and right edges of the window. The EDGE signal and the BTWNCF signal are both provided to inputs of a NAND gate 820, whose output is denominated VBAR, a low-true signal which is employed to generate the visible width of the left and right edges of the window. VBAR is provided through a subsequent NAND gate 821 (shown as an inverted-OR gate), whose output is provided through a base resistor R3 to the base of a driver transistor Q1. The collector of Q1 is tied to a +5 V power supply, while the emitter is the signal WINDOW on line 816 which is wire-ORed with the CURSOR signal to generate a visible white region on the monitor, in the manner as described for the CURSOR signal.

The BTWNGP signal is inverted by an inverter 826 so that the trailing edge of the signal, which occurs at the right edge of the window, clocks a positive edge triggered D-type flip-flop 822. The D input of flip-flop 822 is the BTWNCF signal, which is also provided to one input of an exclusive-OR gate 823. The other input to exclusive-OR gate 823 is the BTWNCF signal. The output of gate 823 on line 825 is provided to one input of a NAND gate 824, the other input to which is the BTWNGP signal. The output of the NAND gate 824 is the low-true signal HBAR, which is provided to the other input of negated-OR gate 21 which together with VBAR signal generates the WINDOW signal. HBAR generates the horizontally extending top and bottom edges of the window.

The HBAR signal is generated as follows. When the BTWNCF signal goes high, indicating that the top of the window has first been encountered, there will be a "one" at the input of exclusive-OR gate 823, which propagates to the input of NAND gate 824. When the leftmost edge of the window has been found, BTWNGP goes high, and the output of NAND gate 824 goes low, generating HBAR. When the rightmost edge of the window is encountered on the same video line, BTWNGP goes low, clocking a "1" into flip-flop 822, and the "1" appearing at the Q output causes the exclusive-OR gate 823 output to go low, removing HBAR.

The INWINDOW signal is employed to select between two different banks of correction signals stored in the ECL RAMs 430 shown in FIG. 10A of the copending referenced grandparent application. These two different banks of correction signals are used to provide correction for regions of a frame inside the window and for regions outside the window. The selection between banks is effectuated by circuitry illustrated in FIG. 6B. Primarily, the address lines A5, A6, and A7 pass through unmodified, while address line A4 is modified as will be described. The INWINDOW signal is provided to the D input of a D-type flip-flop 830 which is clocked by the DELAYED CHROMA DETECT signal on line 831. DELAYED CHROMA DETECT clocks in the INWINDOW signal in synchronism with the changes to the address lines NA0–NA3, as shown in FIG. 2. It will be appreciated from the discussion above that changes to these address lines during operation are derived from circuitry illustrated in FIG. 2 and described hereinabove.

A multiplexer circuit 833 selects between a "1" provided at the A input, and a signal on line 834 at the B input designated as the "window address" line WA5, provided from the Q output of the flip-flop 830. The signal WA5 will be low when it is indicated that the color correction values for the area within the window are to be selected. The output of the multiplexer 833 is provided on line 835 to a jumper J1 which allows normal configuration without windowing, or selection of the present area isolation invention. The other end of the jumper J1 is the output signal A4', which is then grouped together with the lines A5–A7 to form the address lines 437'. When jumper J1 is connected as shown in FIG. 6B to the line 835, area isolation is enabled. If the jumper is connected instead of the line A4 provided on lines 435, operation without windowing is possible.

The SELECT input to the multiplexer 833 is connected to the VERTICAL signal, which selects the A input during vertical retrace interval to hold the line A4' high. During normal operation with area isolation enabled, the B input is selected, and the signal WA5 will be a "1" when areas outside the window are selected, and a "0" when areas inside the window are selected. Accordingly, it will be appreciated that the address line A4' and A5–A7 are then provided to multiplexer 436 shown in FIG. 10A of the referenced copending grandparent application for operation as described therein.

It will now be understood that by forcing the A4' line high for regions outside the window, and low for regions inside the window, different banks of sixteen correction values stored in the ECL RAMs 430 are selected for use in correcting the video signal. This provides advantages in operation not heretofore known in the prior art. For example, the described Korman patent only allows correction for an area defined by its region, without addressing the matter of correction in areas outside the region. Advantageously, therefore, an operator employing the present invention can separately color correct one object having a particular predetermined hue within the window from another object having the same hue outside the window. Still further, a plurality of windows may be simultaneously generated, thereby allowing yet still further particularity in correction. Such an extension would only require duplication of the circuitry of FIGS. 6A and 6B, for each one of the address lines A5, A6, and A7, which would provide selection of up to sixteen different banks of sixteen correction sets, for a plurality of windows.

Turning now to FIG. 7, next will be described several operational features and capabilities of the preferred system employing the preferred embodiment of the area isolation circuit 800. In performing scene by scene color corrections, it is frequently desirable by provide a color correction for a particular object which has been identified both in hue and in spatial region in a first frame, and to ensure that the color correction follows the object as it translates across the screen over a plurality of frames, or perhaps is zoomed in on, or perhaps is warped. With the system of the present invention, such corrections are easily implemented.

Figure 7A:
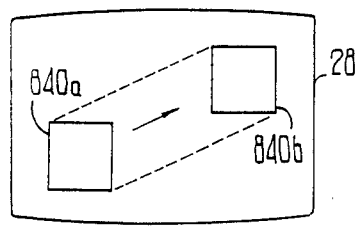
FIG. 7, consisting of FIGS. 7A through 7F, illustrates various modes of operation including moves, zoom, and warp, which is possible with the present invention.

First, and referring to FIG. 7A, a first frame N of a plurality of frames is displayed on the monitor, and a first window 840a placed around an object or area for color correction. The operator then adjusts the controls required to color correct the selected hue within the selected region. Next, the movement of the object is observed over a plurality M of frames until frame N+M is reached. A second window 840b is then placed around the object, and the same color correction recalled from memory. The computer is then signalled that a "move" is to be effectuated, and during the M frames between frame N and N+M, the computer calculates a linear trajectory for the window 840 and establishes appropriate corrections for the window as it moves throughout the M frames. In general, the microcomputer 50' is operative to create a file of color correction values for each scene, when used in a scene by scene color corrector. Separate files are maintained for the inside and outside areas. Each frame which is modified or corrected is provided with a file of corrections for parameters associated with that frame. When a subsequent frame is identified in a frame as requiring corrections, and a dynamic movement is indicated, the computer may be made operative to distribute or apportion the corrections over the frames intervening between the first frame and the second frame. For example, if a dissolve is to be performed, wherein the color of an object changes from one hue to another hue over M frames, the correction values for the first selected frame are associated with file N, and the corrections values for the second selected frame associated with file N+M. All parameters which are to be dissolved between the first frame and the second selected frame are then identified, for example hue. The difference in the absolute values of the resultant hue for the first selected frame and the second selected frame is divided by M to obtain an incremental correction. This incremental correction is then added to each frame, beginning to the first selected frame, until the second selected frame is reached. Of course, each frame receives appropriate color corrections when that particular frame is displayed, as the system provides the appropriate incrementally adjusted values. The next result is that the correction dissolves or is dynamically adjusted over the intervening M frames.

In particular, for a move or translation as shown in FIG. 7A, the computer is operative to calculate the incremental adjustment in the X and Y coordinates of the window as it moves over M frames from 840a to 840b. Accordingly, each frame will have an incrementally different location for the window, and the window will move along a trajectory in the picture space.

It is assumed in conjunction with FIG. 7A that the object or region being color corrected is translating linearly, and is not approaching or receding, requiring a zooming. However, even these types of moves or dynamic adjustments are possible in the present invention. For example, and next referring to FIG. 7B, there is illustrated a "zoom in" situation. A first window 840c in a first selected frame N and a second window 840d in a second selected frame N+M are placed around the object as it translates and is zoomed in on over the plurality M frames between the first selected frame and the second selected frame. The computer calculates the rate of growth of the window 840d in a manner which will be apparent to those skilled in the art. Inasmuch as the computer will have been provided the X and Y coordinates of the region for the window 840c in the frame N, and the X and Y coordinates of the window 840d in frame N+M, it is a simple matter to calculate the linear trajectories of the corners as shown by the lines 841 and 842, since these are simple linear equations.

Figure 7D:
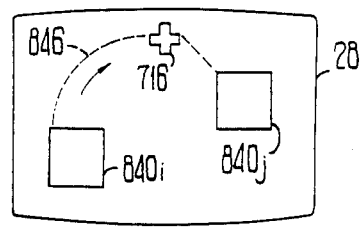
Figure 7B:
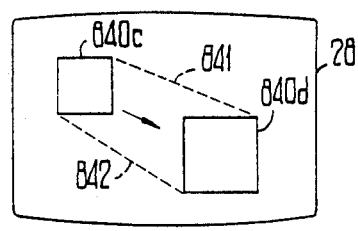
Figure 7E:
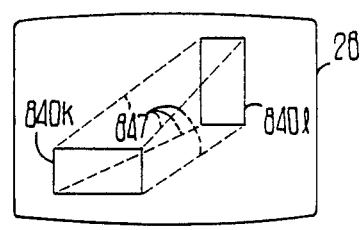
Figure 7C:
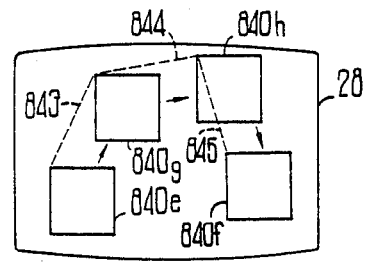

Even if the region translates in a curvilinear path, it is possible with the present invention to track the movement over a plurality of frames by breaking the movement into a piece-wise linear path, as illustrated in FIG. 7C. As shown in FIG. 7C, for the first selected frame N, the window 840e is established around the region of interest. The object is observed over M frames moving to a position indicated by the window 840f. The simplest manner for the operator to handle this type of nonlinear motion is to break the nonlinear motion into a series of linear pieces for ease of computation. Accordingly, as shown in FIG. 7C a first segment indicated by the line 843 is established for a first interim window 840g, followed by line 844 to a second interim window 840h, followed by line 845 to the final window 840f. It will of course be appreciated that by employing such a piece-wise linear technique, the computation required for tracking the object over a plurality of frames are simplified since only linear computations are involved.

Nonlinear translations are also possible, although the computational requirements are somewhat more difficult. Yet, it is considered within the skill of the art to calculate nonlinear trajectories such as illustrated in FIG. 7D. In this situation, a first window 840I is established, and then M frames later it is observed that a second window 840j is desired. The curvilinear path represented by the line 846 is then established prior to drawing the second window by having the operator manipulate the track ball to move the cursor 716 from its initial position, which will remain at the corner of the window 840i along the curvilinear path 846 to the corner of the window 840j. As the track ball is moved, the computer maintains a file of the X and Y coordinates of the cursor. Using this file of X,Y information, it is a simple manner to divide the total X and Y displacement over the M frames into appropriate X and Y increments, and to impose the appropriate divided position during each frame intervening between frame N and frame N+M. Performing such computations by programming microcomputer 50' is considered within the skill of the art.

Warps of rotations are also possible in the present invention, inasmuch as the defined window may change its shape between frame N and frame N+M. Referring in this regard to FIG. 7E, assume that a first window 840k is established in frame N, and a second rectangular window 840l, displaced in space and either changed in shape or rotated, is established by frame N+M. Again, it is a simple linear calculation to compute the trajectories of the corners as illustrated by the lines 847. It will thus be appreciated that the shape of the window can be altered incrementally over M frames by simple linear calculations for each corner.

Figure 7F:
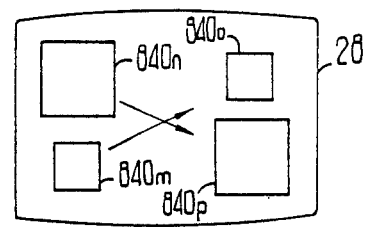

Still further, and as described above, it is possible to provide for a plurality of simultaneous windows in a given, with dynamic movement for each, by providing multiple area isolation circuits 800, one for each of the lines 437. As illustrated in FIG. 7F, this allows for example two windows 840m, 840n associated with a first selected frame N, windows, 840o, 840p associated with a second selected frame N+M, and appropriate translations (or dissolves, zooms, etc.) incrementally apportioned over the M frames. During areas of overlap, in the preferred embodiment the computer is operative to average the corrections provided for the overlapping area. Overlap is detected by comparing the X and Y coordinates of each window on a frame by frame basis.

Yet still further, it should be understood that any parameters which can be altered by the operator can be adjusted incrementally over a plurality of frames by the techniques described in connection with FIGS. 7A-7F. For example, in certain special effects applications, it may be desirable to "dissolve" an object from one color to another color over M frames. Referring back of FIG. 7A, and assuming that an object is both moving over the M frames between the region 840a and 840b, and is to be "dissolved" as well, it will be understood that the microcomputer 50' is programmed to be responsive to a dissolve command signal to incrementally change the selected correction for the window 840a to a different selected correction in the window 840b. This dissolve is effectuated by determining the difference between the correction selected for window 840a and 840b, and dividing by the number of frames M. This provides an incremental parameter change, which is added to (or if appropriate subtracted from) the initial color control setting provided for the first window 840a. During the vertical retrace interval between frames, the new incrementally adjusted correction values are loaded into the ECL RAMs, so that a gradual dissolve from one set of corrections to another is effectuated. This of course allows special effects such as changing object colors, luminance, or any other parameter which is controlled by the system described herein and in the referenced copending grandparent application.

Referring back to FIG. 5, in the preferred embodiment the edges 804 of the window modified so as to minimize the transition from regions outside the selected window 802 to the inside. In the preferred embodiment, this is effectuated by selecting corrections for alternate NTSC lines in the region of the boundaries of the window to have alternate inside and outside correction values. For example, a given line L will have corrections for the inside of the window 802, while line L+1 has the correction for the outside of the window, and line L+2 has corrections again for the inside. This is effectuated by changing the values loaded into the timers 810, 811, which control the definition of the boundaries on the monitor, by a count of two. In the preferred embodiment, the microcomputer 50' is responsive to load these alternate values into the timers in response to the VERTICAL signal.

Because of the two-field NTSC interlacing, on alternate fields, the microcomputer 50' loads values for defining the window region which differ by two so that on the first field of a frame the inside "I" corrections are selected, while on the second field of the outside "O" corrections are selected. Essentially, this merely involves changing the size of the box by two pixels on alternate fields for the left and right edges. Preferably, the first line of the top edge is an "inside" correction, while the next line, in the next field, is an "outside" correction. Similarly, as shown in FIG. 5, preferably the next-to-last line L-1 has "outside" corrections, while the last line L-0 has "inside" corrections. Advantageously, the edges between the inside and outside of the box are smoothed because the eye of the operator cannot resolve the detail, so that an averaging between the values in the inside and outside of the window is performed over the boundaries of the window.

It will also be understood that the present invention may be adapted for operation with a multi-vector type color correction system as described in U.S. Pat. No. 4,096,523 to Belmares-Sarabia, described and referenced above. Referring to FIG. 4, the modifications required to adapt the multi-vector color corrector illustrated in the referenced Belmares-Sarabia patent will now be described. The color correction system described in said patent employs a modified form of the RCA "CHROMACOMP" color correction unit, which is partially illustrated in U.S. Pat. No. 3,558,806 to Monahan et al. That unit includes a color component converter unit 112 (FIG. 4) which converts the I and Q signals into three independent primary color components, red, blue and green, as well as three independent complementary color component or derivative signals, yellow, cyan, and magenta. These signals are produced on lines bearing the corresponding color names. The resulting six independent color component signals in the multi-vector color corrector are delivered to control potentiometers 124 and then into a matrix 114 which conducts these signals from the control potentiometers to reform the primary color component signals red, green and blue. It is while the signals are separated into the independent primary and complementary colors that the signals are modified to effectuate color correction. In accordance with referenced U.S. Pat. No. 4,096,523, color corrections for these six independent primary and complementary colors are imposed by remotely controllable active potentiometer circuits 124, described therein.

In order to provide for selection of one of the independent colors for correction with the present invention, it is necessary to detect the coincidence of the cursor with a hue of interest. Accordingly, and as illustrated in FIG. 4, each of the six independent primary and complementary colors is provided to a conventional voltage comparator circuit 780, where the magnitude of the color component signal is compared to a reference voltage of a predetermined magnitude. Those skilled in the art will understand that the outputs of the voltage comparators 780 provide a sharp rising edge when the magnitude of the noninverting input connected to the independent color component signal exceeds the threshold magnitude of the inverting input. Inasmuch as each of the six independent color derivative signals is present only when the video image color information is predominantly the color of the particular independent color video channel, it will be appreciated that only one of the six voltage comparators 780 will provide an output at a time.

Each of the comparator outputs is provided to one input of an AND-gate 782 provided for each channel, the other input of which is commonly connected to the COLOR SELECT signal. The COLOR SELECT signal is generated as illustrated in FIG. 2 and in the manner described above. In a similar fashion, the CURSOR signal is generated as shown and described in connection with FIG. 2, and mixed with the corrected video signal in a manner which will be understood by those skilled in the art.

The outputs of the AND-gates 782 are provided to respective select inputs A1-A6 of an analog switch circuit 784. The preferred analog switch is a pair of type AD7510DI CMOS analog switches manufactured by Analog Devices, Inc. of Norwood, Mass. The analog inputs IN of the analog switch 784 are commonly connected to control potentiometers for varying a particular parameter of the video signal, for example, a single hue potentiometer 32 which is employed for adjusting the hue as illustrated in FIG. 4. The six outputs OUT of analog switch are provided as the DC control signals supplied to the respective potentiometer circuits 124 in the manner described in the referenced U.S. Pat. No. 4,096,523. It will therefore be appreciated that a single hue potentiometer 32 is employed to provide hue control as opposed to providing a separate hue control for each of the six channels, and that the hue over which control is effectuated is determined by the displacement of the cursor by the operator. The conincidence of the COLOR SELECT signal and a signal provided from one of the comparators 780 results in a routing of the signal from the hue pot 32 to the particular one of the remotely controllable active potentiometer circuits 124 carrying the signal having the hue of interest.

It will also be understood and appreciated that a single saturation and luminance potentiometer can be similarly routed by structure illustrated in FIG. 4 to appropriate remotely controllable potentiometer circuits 124 for control over these parameters as well. Further discussion of the operation of the remotely controllable potentiometer circuits 124, and the other supporting circuitry in the referenced U.S. Pat. No. 4,096,523 may be found therein.

It will now be understood that the circuitry illustrated in FIG. 4 provides a plurality of video parameter correction signals in a multi-vector color corrector, inasmuch as the six independent color derivative signals are employed to control the routing of a correction signal from the hue pot 32 to the appropriate channel containing a signal over which correction is desired. It will be further understood that the circuitry provides means for selecting a particular one of these correction signals in conjunction with the COLOR SELECT signal for selecting a particular one of these video parameter correction signals, and that the routing of correction from the hue pot 32 to the appropriate active potentiometer circuit 124 provides correction means responsive to a selected one of the video parameter correction signals for providing corrected video output signals.

The preferred embodiments of the present invention have been disclosed by way of example and it will be understood that other modifications may occur to those skilled in the art without departing from the scope and the spirit of the appended claims.

What is claimed is:

1. In a video signal correction system, an apparatus for selecting a spatial region in a video image represented by an input video signal and for correcting a video parameter of said input video signal, comprising:
    operator control means for selecting a spatial region on a video monitor displaying said image;

means for providing a plurality of sets of correction signals, each of said sets of correction signals comprising a plurality of correction signals;

means responsive to said selected spatial region for selecting a first set of video correction signals corresponding to a video characteristic for portions of said input video signal corresponding to said selected spatial region;

means responsive to said selected spatial region for selecting a second set of video signal correction signals corresponding to a video characteristic for portions of said input video signal corresponding to regions of said image outside said selected spatial region; and video signal correction means responsive to a video characteristics of said input video signal and to a selected particular one of said first or alternatively of said second set of video signal correction signals for modifying a parameter of said input video signal to provide a corrected video output signal which has different corrections for said selected region and for regions outside said selected region.

2. The apparatus of claim 1, further comprising means for generating a visible display outline of said selected region on said video monitor.

3. The apparatus of claim 1, further comprising first means for selecting a first spatial region associated with a first frame of a plurality of video frames;

second means for selecting a second spatial region associated with a second frame of said plurality of video frames; and means for tracking said first spatial region to said second spatial region.

4. The apparatus of claim 3 wherein said tracking means is operative to maintain said first set of video signal correction signals for said selected spatial region for each frame of said plurality of video frames.

5. The apparatus of claim 3, wherein said second spatial region has the same spatial coordinates as said first spatial region.

6. The apparatus of claim 3, wherein said second spatial region has different spatial coordinates as said first spatial region.

7. The apparatus of claim 6, wherein said second spatial region represents a spatial expansion or contraction as compared to said first spatial region.

8. The apparatus of claim 6, wherein said second spatial region represents a spatial translation of said first spatial region from one area of said image to a spatially distant area.

9. The apparatus of claim 3, wherein said tracking means is operative to incrementally adjust the spatial position of said selected region for each frame of said plurality of frames.

10. The apparatus of claim 3 wherein said tracking means is operative to incrementally adjust the values of said first set of video signal correction signals over each frame of said plurality of frames.

11. The apparatus of claim 10, wherein said incremental adjustment by said tracking means provides a dissolve over said plurality of frames.

12. The apparatus of claim 1, wherein said video parameter is hue.

13. The apparatus of claim 1, wherein said video parameter is saturation.

14. The apparatus of claim 1, wherein said video parameter is luminance.

15. The apparatus of claim 1, further comprising second operator control means responsive to select a color region as a function of the color of said video image.

16. The apparatus of claim 1, wherein said video signal correction means comprises a phase responsive video signal correction system.

17. The apparatus of claim 1, further comprising third operator control means for providing color control signals corresponding to a color correction provided by an operator for said selected region, and means for converting said color control signals into said video signal correction signals.

18. The apparatus of claim 17, further comprising addressable memory means for storing said first and said second set of correction signals in a plurality of addressable locations, and wherein said third operator control means are operative to load said addressable memory with correction signals corresponding to operator corrections.

19. The apparatus of claim 1, wherein said selecting means comprises:

means for selecting a first X and Y coordinate of a first portion of said spatial region on a video monitor display of said video image;

means for selecting a second X and Y coordinate of a second portion of said spatial region on said video monitor display;

means responsive to said first X and Y coordinate and said second X and Y coordinate for defining a visible outline of said selected spatial region on said video monitor display.

20. The apparatus of claim 19, wherein said X and Y coordinate selecting means comprises track ball means.

21. In a video signal correction system, an apparatus for selecting a spatial region in a video image represented by an input video signal and for correcting a video parameter of said input video signal, comprising:

spatial region selecting means selectively actuatable for selecting a spatial region on a video monitor displaying said image;

means for providing a plurality of sets of video parameter corrections;

means for selecting a first one of said sets of video parameter corrections for portions of said input signal corresponding to said selected region;

means for storing said first set of video parameter corrections;

means for selecting a second one of said sets of video parameter corrections for portions of said input video signal corresponding to regions of said video image outside said selected region;

means for storing said second set of video parameter corrections;

operator control means for modifying said first set and said second set of video parameter corrections;

means for selectively actuating said spatial region selecting means;

means responsive to the actuating of said spatial region selecting means for selecting said first and said second sets of video parameter corrections;

means responsive to the absence of actuation of spatial region selecting means for selecting only said second set of color corrections; and correction means responsive to selected ones of said sets of video parameter corrections for correcting a parameter of said input video signal to provide a corrected video output.

22. The apparatus of claim 21, further comprising means for tracking a first selected spatial region associated with a first frame of a plurality of frames to a second spatial region associated with a second frame of said plurality of frames by modifying the location of said first selected spatial region with respect to an image reproduced by said input video signal.

23. The apparatus of claim 22, wherein said tracking means is operative to maintain said set of color corrections for said selected spatial region for each frame of said plurality of video frames.

24. The apparatus of claim 22, wherein said second spatial region has the same spatial coordinates as said first spatial region.

25. The apparatus of claim 22, wherein said second spatial region has different spatial coordinates as said first spatial region.

26. The apparatus of claim 25, wherein said second spatial region represents a spatial expansion or contraction as compared to said first spatial region.

27. The apparatus of claim 25, wherein said second spatial region represents a spatial translation of said first spatial region from one area of said image to a spatially distant area.

28. The apparatus of claim 22, wherein said tracking means is operative to incrementally adjust the spatial position of said selected region for each frame of said plurality of frames.

29. The apparatus of claim 22, wherein said tracking means is operative to incrementally adjust the values of said first set of color corrections over each frame of said plurality of frames.

30. The apparatus of claim 29, wherein said incremental adjustment by said tracking means provides a dissolve over said plurality of frames.

31. A system for correcting a video parameter of an image represented by an uncorrected input video signal, comprising:
   means for generating a variably positionable selection cursor on a video monitor displaying said input video signal;
   operator control means for positioning said cursor on said video monitor;
   means responsive to the position of said cursor on the video monitor for providing cursor position signals;
   means for providing a plurality of sets of video parameter correction signals;
   means responsive to said cursor position signals for defining a spatial region on said video monitor;
   correction signal set selecting means responsive to a defined spatial region for selecting a first one of said sets of said video parameter correction signals for said defined spatial region and a second one of said sets of said video parameter correction signals for regions outside said defined spatial region;
   correction signal selecting means responsive to a video characteristic of said input video signal for selecting a particular one of said video parameter correction signals in one of said selected sets; and
   correction means responsive to said selected particular one of said video parameter correction signals for correcting said input video signal to provide a corrected video output signal.

32. The system of claim 31, wherein said operator control means comprises track ball means.

33. The system of claim 31, further comprising:
   second operator control means for providing color control signals corresponding to a color correction provided by an operator; and
   programmed computer means responsive to associate said color control signals with said selected one of said video parameter correction signals, whereby color controls made by an operator are associated with said defined spatial region of the image.

34. The system of claim 33, further comprising addressable memory means for storing said plurality of video parameter correction signals in a plurality of addressable locations, and wherein said second control means is operative to cause said computer means to load said addressable memory with correction signals corresponding to operator corrections for said defined spatial region.

35. The system of claim 31, wherein said correction means comprises addressable memory means for storing a plurality of correction signals in a plurality of addressable locations, counter means for addressing said memory means, and synchronizing means for resetting said counter means to a predetermined initial address at predetermined intervals such that said memory means repeatedly provides said plurality of correction signals, and wherein said correction signal selecting means is responsive to select one of said plurality of said correction signals being provided by said memory means.

36. A system for correcting a video parameter of an image represented by an uncorrected phase encoded input video signal, comprising:
   phase detecting means responsive to detect relative phase bewteen said input video signal and a phase reference signal;
   correction signal means responsive to said phase reference signal for providing a plurality of sets of correction signals, each of said sets of correction signals containing a plurality of correction signals, each one of said correction signals being related to a predetermined range of phase differences between said phase reference signal and said input video signal;
   means for generating a variably positionable selection cursor on a video monitor displaying said input video signal;
   operator control means for positioning said cursor on said video monitor;
   means responsive to the position of said cursor on the video monitor for providing cursor position signals;
   means responsive to said cursor position signals for defining a spatial region on said image;
   correction signal selecting means responsive to said defined spatial region for selecting a particular one of said sets of correction signals corresponding to said defined spatial region; and
   correction means responsive to said selected particular one of said sets of correction signals for correcting said input video signal to provide a corrected video output signal.

37. The system of claim 36, wherein said video parameter is a color parameter, and further comprising:
   second operator control means for providing color control signals corresponding to a color correction provided by an operator; and
   programmed computer means responsive to associate said color control signals with said selected one of said video parameter correction signals, whereby color controls made by an operator are associated with said defined region of the image.

38. The system of claim 37, further comprising addressable memory means for storing said plurality of correction signals in a plurality of addressable locations, and wherein said second control means is operative to cause said computer means to load said addressable memory with correction signals corresponding to operator corrections.

39. The system of claim 36, wherein said correction means comprises addressable memory means for storing a plurality of correction signals in a plurality of addressable locations, counter means for addressing said memory means, and synchronizing means for resetting said counter means to a predetermined initial address at predetermined intervals related to said phase reference signal such that said memory means repeatedly provides said plurality of correction signals each cycle of said phase reference signal, and wherein said correction signal selecting means is responsive to select one of said plurality of said correction signals being provided by said memory means.

40. A system for correcting a video parameter of a portion of a video image represented by an uncorrected phase encoded input video signal, said portion of said video image being at least partially defined by a predetermined hue, comprising:
  phase detecting means responsive to detect said predetermined hue by detecting relative phase between said input video signal and a phase reference signal and responsive to provide a chroma detect signal related to said predetermined hue;
  correction signal means responsive to said phase reference signal for repeatedly providing a plurality of correction signals, each of said correction signals being related to a predetermined range of phase differences between said phase reference signal and said input video signal;
  means for generating a variably positionable selection cursor on a video monitor displaying said input video signal;
  operator control means for positioning said cursor on said video monitor and for providing a cursor position signals related to the location of said cursor with respect to said video image;
  means responsive to said cursor position signals for defining a spatial region on said video image;
  means responsive to a selected spatial region for causing said correction signal means to provide a first set of correction signals for portions of said input video signal corresponding to said selected spatial region and a second set of correction signals for portions of said input video signal corresponding to regions outside said selected spatial region;
  correction signal selecting means responsive to said chroma detect signal for selecting a particular one of said first set of correction signals for portions of said input video signal corresponding to said selected spatial region and for selecting a particular one of said second set of correction signals for portions of said input video signal corresponding to regions outside said selected spatial region; and
  correction means responsive to said selected particular one of said correction signals for correcting said input video signal to provide a corrected video output signal.

41. In a video signal correction system, an apparatus for selecting a spatial region in a video image represented by an input video signal, for correcting a video parameter of said input video signal, and for deemphasizing the perception of the transition on said video image between a selected spatial region and regions outside said selected spatial region, comprising:
  operator control means for selecting a spatial region on a video monitor displaying said image;
  means for imposing a first video parameter correction upon portions of said input video signal representing regions inside said selected spatial region;
  means for imposing a second video parameter correction upon portions of said input video signal representing regions outside said selected spatial region;
  means for defining a boundary region between said selected spatial region and regions outside said selected spatial region; and
  means for alternating correction between said first video parameter correction and said second video parameter correction for portions of said image in said boundary region,
  whereby the edges of the selected spatial region are modified to minimze the perception of transition from regions outside the selected spatial region and region of said the selected spatial region.

42. The apparatus of claim 41, wherein said alternating correction means alternates between said first video parameter correction and said second video parameter correction on alternate lines of a video field.

43. The apparatus of claim 41, wherein said alternating correction means alternates between said video parameter correction and said video parameter correction on alternate fields of a video frame.

* * * * *